United States Patent Office 3,045,054
Patented July 17, 1962

3,045,054
NICKEL OXIDE CATALYSTS AND THEIR USE IN POLYMERIZING OLEFINS
Vernon C. F. Holm, Grant C. Bailey, and Alfred Clark, Bartlesville, Okla., assignors to Phillips Petroleum Company, a corporation of Delaware
No Drawing. Original application Apr. 6, 1956, Ser. No. 576,516, now Patent No. 2,949,429, dated Aug. 16, 1960. Divided and this application Jan. 20, 1960, Ser. No. 3,492
11 Claims. (Cl. 260—683.15)

This invention relates to an improved method or process for preparing supported nickel oxide catalysts for the polymerization of olefins, to the resulting novel catalysts, and to the polymerization of olefins in contact with said catalysts.

This application is a division of our application S.N. 576,516, filed April 6, 1956, now Patent No. 2,949,429.

The polymerization of olefins with nickel oxide supported on silica-alumina and other porous supports is disclosed in patents to G. C. Bailey and J. A. Reid, 2,381,198 and 2,581,228. The process disclosed is particularly useful in view of the fact that it is effective in polymerizing ethylene as well as higher olefins. The polymerization of ethylene to liquid polymers is particularly difficult and can be effected by very few known catalysts.

In any catalytic conversion process the activity of the catalyst as measured by the yield of desirable product is significant to the commercial success of the process. It is, of course, desirable to utilize as effective a catalyst as possible; and any appreciable increase in yield produced by an improved catalyst represents a distinct advance in the process or art to which it is related.

Accordingly, it is an object of the invention to provide an improved process for making supported nickel oxide polymerization catalysts and resulting novel catalysts. Another object is to provide more active supported nickel oxide catalysts for olefin polymerization than have heretofore been known. A further object is to provide a more efficient and effective process for polymerizing olefins to liquid polymers. Other objects of the invention will become apparent from a consideration of the accompanying disclosure.

Supported nickel oxide catalysts are ordinarily prepared by impregnation of a selected support, such as silica-alumina, with a nickel salt which is convertible to the oxide by heating, subsequently drying the impregnated support, and then heating the same to a temperature in the range of about 300 to 700° C. to convert the nickel salt to the oxide. The heating is usually effected in an oxygen-containing ambient such as air or, at least, in a non-reducing ambient. The catalyst ordinarily contains from about 0.1 to 10 weight percent nickel, although higher amounts may be used. Optimum activity ordinarily is associated with the amount of nickel in this range however, and, hence, little is to be gained by using larger amounts. The concentration of nickel salt in the impregnating solution varies with the desired ultimate concentration of nickel on the final catalyst. Obviously, more concentrated solutions of nickel salt are used to produce greater concentrations of nickel in the final catalyst.

One aspect of the present invention comprises impregnating the selected support with an aqueous solution of nickel salt convertible to the oxide upon heating, particularly in an oxygen-containing ambient, and utilizing a plurality of impregnating steps with conversion of the nickel salt to the oxide between impregnation steps and after the last one. The conversion of the nickel salt to the oxide after each impregnation prevents loss of nickel compound from the support during a subsequent impregnation. It has been found that multiple impregnation of the support with nickel oxide, via a suitable nickel salt, produces a more active catalyst than is prepared by a single impregnation step which deposits a corresponding amount of nickel oxide on the catalyst. Three or more impregnations are preferred, but only two impregnations with conversion to the oxide after each produces a catalyst of enhanced activity.

It has also been found that hot impregnation of the catalyst support effects a substantial improvement in the activity of the catalyst, even when utilized with single impregnation and, of course, when the two improvements are combined the effects of the individual improvements are additive. Hence, this aspect of the invention comprises impregnating a suitable carrier with a hot aqueous solution of nickel salt at a temperature of at least 70° C. and up to the boiling point of the solution and, preferably, maintaining the mixture of support and solution at a temperature in this range for a substantial period, such as at least 10 minutes and preferably 15 minutes or longer, to effect the desired and improved impregnation.

Catalyst supports useful in the invention include silica-alumina, alumina, silica, kieselguhr, activated clay, charcoal, and the like. The most effective and the preferred support is silica-alumina and, particularly, silica-alumina in which the silica is in major proportion, preferably at least 75 weight percent of the support. Nickel compounds or salts which have been found to be effective in the impregnation process of the invention are nickel nitrate and the alkyl carboxylic acid salts of nickel such as the formate and the acetate. The complex ammonium salt of the nitrate as disclosed in our copending application Serial No. 580,705, filed April 26, 1956, now U.S. Patent 2,904,608, is also effective.

In order to illustrate the invention, the following specific examples are presented but they are not to be construed as unnecessarily limiting the invention.

EXAMPLE I

Pellets of commercial silica-alumina cracking catalyst were broken and a 16-30 mesh fraction was separated. About 50 ml. of the 16-30 mesh fraction was treated with about 75 ml. of an 0.8 molar nickel nitrate solution. After about 15 minutes, the support was drained and then dried in an evaporating dish on a hot plate with constant stirring. After further drying in an oven at 110° C., the catalyst was heated gradually to 500° C. in a stream of dried air and then held at this temperature for five hours to decompose the nickel nitrate to nickel oxide.

A second catalyst was prepared in accordance with the present invention in which the impregnation was carried out in three steps with a nickel solution of one third the concentration used above. The nickel nitrate added to the catalyst in each impregnation was converted to nickel oxide prior to the subsequent impregnation by heating as before.

Ethylene polymerization tests were made with each catalyst using a glass reactor equipped with an axial thermocouple well that permitted temperature measurements on the catalyst bed which was supported on a perforated glass platform in the hot zone of the reactor. The reactor was mounted in a vertical tube furnace fitted with a heavy metal sleeve for temperature equalization. Dried ethylene was admitted at the top from a calibrated flow meter and the reacted mixture was passed through a trap cooled by a Dry-Ice bath below the reactor. The unreacted ethylene from the trap was passed through a second calibrated flow meter. Thus with a given flow rate of ethylene, readings of the second flow meter made possible a satisfactory calculation of the instantaneous values for the conversion of ethylene to dimers, trimers, and higher polymers.

Prior to a run, the reactor was charged with 2 ml. of the catalyst and with a slow stream of dry nitrogen flowing, the furnace was heated to 400° C., held at this temperature for about an hour, and cooled to room temperature overnight. Then with the refrigerated receiver in place, the nitrogen was cut off and the flow of Phillips Petroleum Company's research grade ethylene started at a gaseous hourly flow rate of 2500 v./v./hr. The furnace was turned on at a voltage to attain 300° C. in two hours. Flow meter and temperature readings were made at five minute intervals. Maximum conversion occurred at the maximum temperature, 300° C.

*Results of Runs*

| Impregnating Method | Percent Nickel on Catalyst | Percent Ethylene Polymerized, Maximum Conversion |
| --- | --- | --- |
| One-step | 3.4 | 54 |
| Multi-step | 2.74 | 56 |

Comparison of the ethylene conversion effected with one step and multi-step impregnated catalysts, particularly, when considered in the light of the nickel content of the catalyst, shows that multi-step impregnation is effective in preparing more active supported nickel oxide catalysts.

EXAMPLE II

Pellets of commercial silica-alumina cracking catalyst were broken and a 16-30 mesh fraction separated. About 50 ml. of the 16-30 mesh fraction was separated and was treated with about 75 ml. of an 0.8 molar nickel nitrate solution. After about 15 minutes, the support was drained and then dried in an evaporating dish on a hot plate with constant stirring. After further drying in an oven at 110° C., the catalyst was heated gradually to 500° C. in a stream of dried air and then held at this temperature for five hours to decompose the nickel nitrate to nickel oxide.

A second catalyst was made in accordance with the present invention in a similar manner with the exception that the impregnating solution of nickel nitrate was at a temperature of 90-95° C. when added to the 16-30 mesh support, and the temperature during the 15-minute soaking period was mantained at this level.

Ethylene polymerization tests were made with each catalyst in the manner described in Example I.

*Results of Tests*

| Impregnating Method | Percent Nickel on Catalyst | Percent Ethylene Polymerized, Maximum Conversion |
| --- | --- | --- |
| Hot Impregnation | 3.12 | 62 |
| Rm. Temp. Impregnation | 3.4 | 54 |

It can be seen from the above results that hot impregnation results in a catalyst of higher activity.

Olefin polymerization conditions conventional in the art are applicable to the olefin polymerization process of the invention utilizing our improved more active catalyst. Preferred operating conditions are set forth in the above-identified Bailey et al. patents.

Certain modifications of the invention will become apparent to those skilled in the art and the illustrative details disclosed are not to be construed as imposing unnecessary limitations on the invention.

We claim:

1. A process for polymerizing a normally gaseous olefin which comprises contacting such an olefin under polymerizing conditions with a supported nickel oxide catalyst, said catalyst having been made by contacting a porous particulate support with an aqueous solution of a nickel compound readily convertible to the oxide by heating in a non-reducing ambient so as to adsorb on said support between 0.1 and 10 weight percent of nickel in the form of said compound, maintaining said solution at a temperature in the range of 70° C. to the boiling point thereof during the contacting step, drying the resulting impregnated support, thereafter converting the adsorbed nickel compound to the oxide, and thereafter repeating, at least once, the contacting, drying and conversion steps, so as to form liquid polymer.

2. The process of claim 1 wherein the catalyst support consists essentially of silica-alumina.

3. The process of claim 1 wherein said olefin is ethylene.

4. The process of claim 1 wherein said olefin is propylene.

5. A process for polymerizing a normally gaseous olefin which comprises contacting such an olefin under polymerizing conditions with a supported nickel oxide catalyst, said catalyst having been made by contacting a porous particulate support with an aqueous solution of a nickel compound readily convertible to the oxide by heating in a non-reducing ambient so as to adsorb nickel compound on said support, drying the resulting impregnated support, therafter converting said nickel compound to the oxide by heating the dried support, and thereafter repeating, at least once, the contacting, drying, and conversion steps on said support to produce a final catalyst containing an amount of nickel in the range of 0.1 to 10 weight percent of the support, so as to form liquid polymer.

6. The process of claim 5 wherein the catalyst support consists essentially of silica-alumina.

7. The process of claim 5 wherein said olefin is ethylene.

8. The process of claim 5 wherein said olefin is propylene.

9. The process of claim 2 wherein said olefin is ethylene.

10. The process of claim 1 wherein said support consists essentially of silica-alumina, said olefin is ethylene and said nickel compound is nickel nitrate.

11. The process of claim 5 wherein said support consists essentially of silica-alumina, said olefin is ethylene, and said nickel compound is nickel nitrate.

References Cited in the file of this patent

UNITED STATES PATENTS

| 2,581,228 | Bailey et al. | Jan. 1, 1952 |
| 2,825,721 | Hogan et al. | Mar. 4, 1958 |
| 2,837,587 | Hogan et al. | June 3, 1958 |